United States Patent [19]

Khamharn

[11] Patent Number: 5,767,784
[45] Date of Patent: Jun. 16, 1998

[54] INITIALIZATION METHOD FOR KEYLESS ENTRY SYSTEM

[75] Inventor: Oddy N Khamharn, Milwaukee, Wis.

[73] Assignee: Delco Electronics Corporation, Kokomo, Ind.

[21] Appl. No.: 545,993

[22] Filed: Oct. 20, 1995

Related U.S. Application Data

[63] Continuation-in-part of Ser. No. 257,982, Jun. 10, 1994, Pat. No. 5,506,905.

[51] Int. Cl.$^6$ ........................................ H04Q 1/00
[52] U.S. Cl. ...................... 340/825.31; 340/825.34; 340/825.3
[58] Field of Search ................. 340/825.31, 825.34, 340/825.33, 825.3, 825.69; 380/23

[56] References Cited

U.S. PATENT DOCUMENTS

| | | | |
|---|---|---|---|
| 4,750,118 | 6/1988 | Heitschel | 340/825.31 |
| 5,416,471 | 5/1995 | Treharne | 340/825.31 |
| 5,473,318 | 12/1995 | Martel | 340/825.31 |
| 5,506,905 | 4/1996 | Markowski | 380/23 |

*Primary Examiner*—Brian Zimmerman
*Attorney, Agent, or Firm*—Mark A. Navarre

[57] ABSTRACT

A system for remotely controlling a desired door locking or other function in a vehicle or other protected environment has a transmitter and receiver for communicating a message including a sequence number, the code of a selected function to be performed and an authenticator. An algorithm in the transmitter and in the receiver has a cryptographic key and a seed code. Each algorithm generates the authenticator as a function of both the seed code and the function code; if the authenticators are equal, the message is valid. Upon each transmission the seed code is updated and the sequence number is incremented. The receiver updates its seed code according to the transmitted sequence number to keep the algorithms in synchronism. To initialize the receiver to recognize the transmitter IDs, the receiver is manually enabled for programming, a counter is set to zero, the ID is transmitted from each transmitter, each ID is stored in sequence, and the counter is incremented for each ID received. During access mode only IDs in locations corresponding to the count value and lower values are used for validation.

3 Claims, 4 Drawing Sheets

| LOCATION | BEFORE | AFTER |
|----------|--------|-------|
| 1 | TY | AP |
| 2 | ZA | YM |
| 3 | CD | CD |
| 4 | GX | GX |

INITIALIZATION METHOD FOR KEYLESS ENTRY SYSTEM

This is a continuation-in-part of application Ser. No. 08/257,982 filed Jun. 10, 1994 now U.S. Pat. No. 5,506,905.

FIELD OF THE INVENTION

This invention relates to a keyless entry system for a motor vehicle or other protected environment, and particularly to an initialization method for for a keyless entry system to permit adding new transmitters to replace those previously used in a system.

BACKGROUND OF THE INVENTION

Personal-size remote control transmitters are widely used to provide a convenient method of locking or unlocking vehicles, and/or to remotely arm or disarm vehicle theft deterrent systems. They are also used to control home/business security systems and garage door openers. If these transmissions can be spoofed or played back, then these systems can be controlled by unauthorized parties to gain unwanted access to the protected environment. Most, if not all, of these systems provide very little protection against spoofing and no protection at all against the playback of legitimate messages that have been recorded and/or modified. The term "spoofing" as used herein refers to the creation of a false message that is accepted by the system as a valid message.

Conventional vehicle keyless entry systems prevent accidental interference from other transmitters through the use of frequency separation and identification codes. Some manufacturers use only one frequency, while others may have a number of frequencies available (but usually only one is used in any given system). Identification codes are then used to further ensure that one person's transmitter will not accidentally control someone else's system. These systems typically prevent guessing the identification code (usually between 16 and 32 bits) with penalty functions that limit the rate at which transmissions can be processed. For example, limiting receptions to one per second places a limit on how long it might take a thief to find the correct identification number by trying all possible combinations. However, these systems will accept any previously transmitted message that had been recorded and played back at any time in the future. Playback attacks can therefore be implemented very inexpensively, and such attacks are known to be used by professional car thieves who target specific vehicles. Since a successful attack will usually unlock the doors and simultaneously disarm alarm and ignition disable systems, the risk of being caught is significantly reduced.

A simple method of preventing playback attack is to include a simple dynamic security code in the message that changes with each transmission. The receiver calculates the next code in the sequence, and accepts a message as valid only if the received code matches the expected code. This method is insecure for three reasons. First, a thief can predict the next code sequence from knowledge of previous sequences, in much the same way as the receiver can predict which sequence to expect based on the last transmission. Second, once the code sequence has been determined, it can be used to issue false commands to all similar receivers. Third, the algorithm used to generate the code sequence must usually be kept secret, because a thief can much more easily predict the code sequences when the algorithm is known.

Message authentication using cryptographic techniques is a better method for preventing spoofing and playback attacks. However, applying conventional message authentication to personal transmitter-based systems has not been used in the past since the available authentication algorithms have been too complex for implementation in very low cost systems. In addition, significantly larger message sizes were necessary to accommodate cryptographic synchronization, and the resulting increase in transmission time significantly reduced the expected life of the miniature batteries typically used. The solution to this problem is the object of the previous patent application, identified above.

An additional concern is that when it is necessary to replace transmitters for any reason, the receiver must be programmed or initialized to accept the identification (ID) of the new transmitter and be insensitive to the IDs of the previous transmitters. Any arrangement for implementing such replacement must be simple and easily accomplished in the field by service technicians or vehicle owners. Previously the method of implementing replacements required erasing all the memory locations for the ID and related information. Typically the memory is an EEPROM and it is undesirable to write or erase such memory more than necessary because EEPROMs have limited write cycles. Further the erase function for all location requires extra execution time and software code burden which should be minimized. It is also desirable to employ unused memory locations for product information which is useful when a receiver is returned for warranty purposes, but this is not possible when erasure is likely.

SUMMARY OF THE INVENTION

It is therefore an object of the invention to reprogram keyless entry systems in the field to accept transmitters with unique IDs which replace previous transmitters. Another object is to invalidate those IDs previously stored in the receiver memory. A further object is to minimize writing to memory. Still another object is to allow use of memory storage for product information.

A vehicle keyless entry system is composed of a transmitter for use by the vehicle's driver, and a receiver located within the vehicle. The transmitter emits RF signals in response to the activation of one or more buttons. The receiver periodically checks for the presence of a transmission, and performs the requested function only if fields within the message are intended for that particular receiver and it contains a valid security code.

A cryptographically based dynamic security code is included in the message structure to prevent the recording and subsequent playback of legitimate messages, and to prevent a receiver from being deceived into accepting messages from unauthorized sources. The security code sequence is determined by cryptographic techniques to assure that it is not predictable from knowledge of past sequences.

Once a transmitter is manufactured, it is programmed with a transmitter identification (ID), a default sequence number, a randomly generated initial seed, and a cryptographic key. The transmitter ID and initial seed are unique to each transmitter. The cryptographic key may be common to all transmitters, common only to some number of transmitters, or unique to each transmitter. The randomly generated initial seed is used as the starting point from which the authentication algorithm advances with each transmission. The sequence number also advances with each transmission to indicate to the receiver the required number of advances that it must perform to cryptographically synchronize with the transmission.

Receivers must be programmed to accept messages from one or more particular transmitters. In the preferred embodiment, the transmitter sends a special message which contains the transmitter ID, initial seed and cryptographic key. The receiver records this information in non-volatile memory so that it may recognize that transmitter in the future. With this method of programming a receiver is easily re-programmed to accept new transmitters in the field in case a transmitter is lost or the receiver becomes damaged or fails. A program switch is provided within the vehicle to enable this receiver function and to prevent transmissions from unauthorized transmitters from altering this information.

When the program switch is operated to place the receiver in program mode, each new transmitter must be operated to send the special message which is stored in the receiver memory. To allow the use of up to four different transmitters, four memory locations are provided. The information is stored in first, second, third and fourth memory locations in the sequence received and is written over any previous data in those locations. If fewer than four transmitters are exercised during reprogramming, the memory locations not used by new data will not be disturbed and the old data will remain intact. This old data is not, however, available during reception of subsequent command messages to verify the transmitter ID. During reprogramming, a counter, initialized to zero, is incremented upon receipt of each ID. Thus if only two transmitters sign on, for example, the count will be two. The final count is saved. Then in access mode during receipt of a command message the final count will be recalled and the ID at the corresponding location will be compared with the message ID. If there is no match, the count is decremented and IDs are again compared, and so on. Thus each of the newly programmed IDs is accessible for matching with the message ID but any old data is not accessed, thereby locking out previously used transmitters.

Since the ID and other data, as well as the counter value must be stored in non-volatile memory, EEPROMs are typically used. EEPROMs have only a limited number of write cycles and thus it is advantageous to minimize writing including erasures. An advantage of the method of the invention is that compared to a method requiring erasure of all memory locations, the writing requirements are reduced because the processor does not have to waste time erasing locations which are not used. At the same time, the execution time is faster and the software code requirements are reduced since erasures of some locations are often not needed. Another advantage is that the execution during read access is faster since the receiver knows which locations have valid IDs and time is not wasted looking in locations which do not contain valid IDs. Also, since four memory locations are provided and usually only two transmitters are used with each receiver, two memory locations will usually be unused for the active IDs. This provides an opportunity to write in those spaces product information such as the date of manufacture or the IDs of transmitters which were originally paired with the receiver. This information aids in trouble-shooting receivers which are returned to the factory for service or for warranty investigation without in any way sacrificing security.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

OVERVIEW

Although the ensuing description is directed to a vehicle keyless entry system, it applies as well to garage door operators and to home or business security systems.

Figure 1:
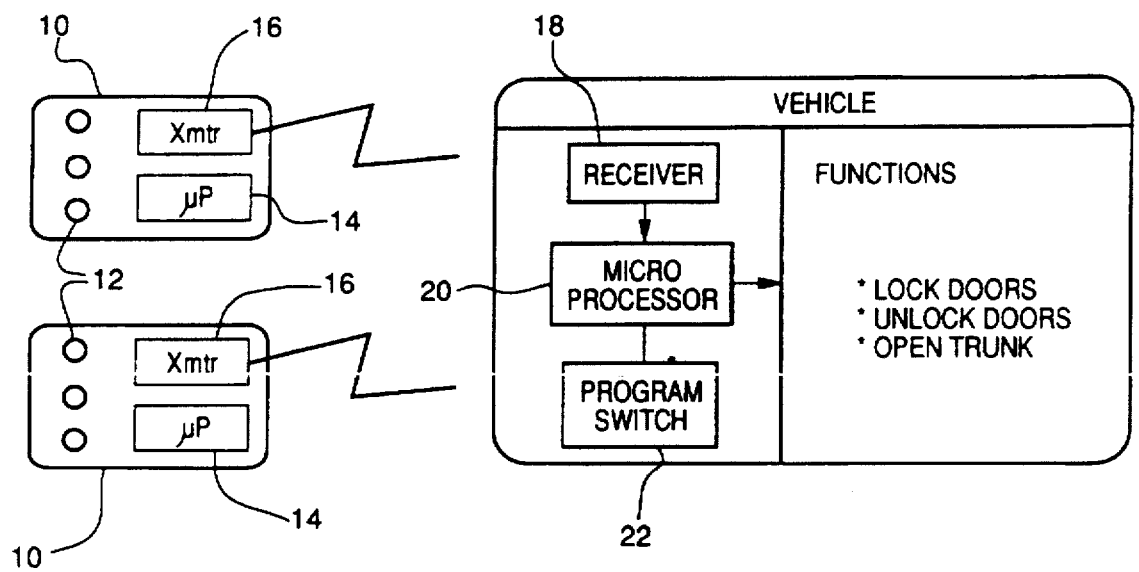
FIG. 1 is a block diagram illustrating a keyless entry system for a motor vehicle.

FIG. 1 shows a keyless entry system for a motor vehicle which includes a number of portable remote controls or fobs 10 small enough to carry in one's pocket or on a key chain. Each fob 10 has buttons 12 for manual selection of desired functions to be performed in the vehicle, a microprocessor 14 responsive to button actuation for formulating a command message, including an authenticator code and a function code identifying the desired function to be performed, and a radio transmitter 16 for transmitting the message. The fob 10 functions are supported by a miniature battery, not shown, which should have a life of several years. In the vehicle a receiver 18 receives the transmitted message, if the vehicle is within the transmitter range, and a microprocessor 20 acts upon data in the received message to determine whether the authenticator code is valid, and if so, to perform the desired function.

Each microprocessor 14 and 20 is programmed to execute a cryptographic algorithm which operates on certain stored and/or transmitted data, as well as on a selected function code to generate an authentication code which is different for every transmission, thus preventing successful replay of a previously transmitted message. The authentication code is sufficiently short to be transmitted economically but the generation procedure has a complexity that renders it impractical for an adversary to predict the next valid code based on knowledge of previously transmitted messages. The procedure for message validation is first to compare the transmitter ID with IDs stored in the receiver memory, and if an ID match is found, then for the algorithm in the microprocessor to operate on a combination of shared secret data and transmitted data to produce authentication codes, and to determine that the command is valid if the codes are the same.

Two mechanisms are jointly used to assure that the authentication code changes in an unpredictable manner. First, the algorithm operates on a seed code which is changed according to a set of rules for each transmission. A sequence number is also incremented with each transmission and is included in the message so that the receiver algorithm will know how many seed code changes to execute in order to resynchronize with the transmitter since the receiver does not necessarily receive each transmission. Second, the authenticator code is generated as a function of the seed code and the cryptographic key as well as the desired function code. Since for each transmission the function code depends on which button the operator selects, another level of complexity is added to the authenticator code generation to confound attempts to determine a predictable progression of codes.

Figure 2:
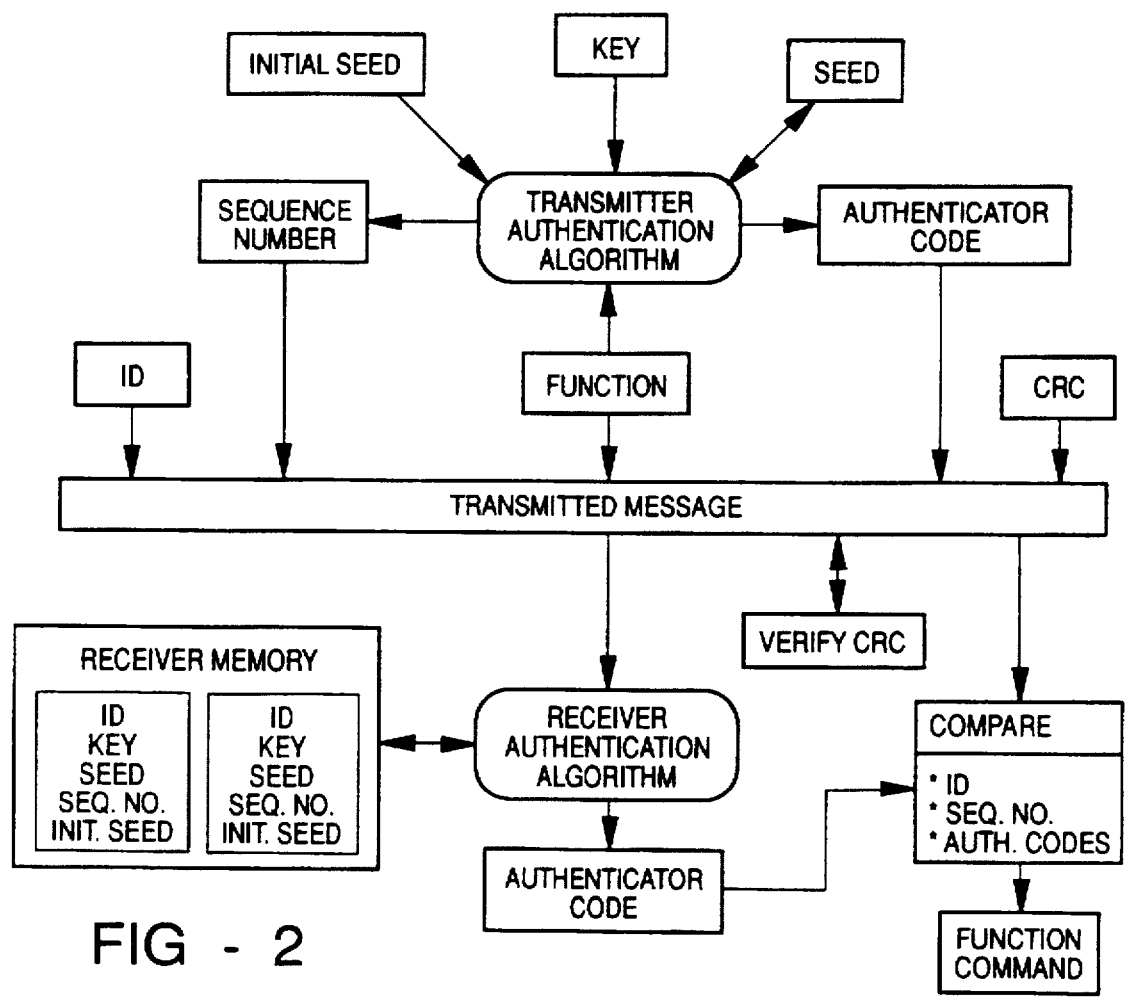
FIG. 2 is a block diagram illustrating the keyless entry system with authenticated communication according to the invention.

The upper portion of FIG. 2 illustrates the data inputs to the transmitter algorithm and to various fields of the transmitted message, and the authenticator code which is the product of the algorithm and also forms a field of the message. A cyclic redundancy code (CRC) is also calculated from all the other field data and included in the message. The unique ID assigned to each transmitter also forms a field of each message, but the ID does not enter the algorithm calculation. The algorithm may be any cryptographic-based authentication algorithm. Typically the specific procedures of such an algorithm will be determined by the mathematical function, a key, and on an initial working state known as a seed. Here the seed value is initially programmed into the transmitter, but the seed value is then updated with each transmission and is stored separately. This continuously updated seed value is used as the initial state of the algorithm for the calculation of each authenticator. The initial seed, the key, and the ID are permanently stored in each transmitter. A sequence number, beginning at 1, is incremented with each transmission. A function code representing a command to lock doors, unlock doors, etc. as selected by the buttons from a table of stored function codes, is also input to the algorithm which then generates an authenticator code as a function of the current seed and the function code. The message to be transmitted is then assembled and includes a preamble, the selected function code, the transmitter ID, the sequence number, the authenticator, and the CRC, as shown in FIG. 3.

The lower part of FIG. 2 represents the receiver functions which includes a memory for each associated transmitter comprising its ID, its key, its last calculated seed value, its last reported sequence number, and its initial seed value. When a message is received the CRC is verified, the transmitted ID is matched to one of the stored IDs and the stored data related to that ID is used by the algorithm along with the transmitted function code and sequence number to generate a receiver authenticator. If it is equal to the transmitted authenticator the message is verified as legitimate and the operation indicated by the function code is performed. In case the stored sequence number is less than the one in the message, the algorithm will advance the seed value and the sequence number until the sequence numbers are equal; then the transmitter and receiver seed values will also be equal and the authenticator can be calculated.

MESSAGE STRUCTURE

Figure 3:
FIG. 3 is an illustration of message structure for normal messages according to the invention.

The message structure for normal messages (e.g., door lock, door unlock, trunk/hatch release, and panic) is shown in FIG. 3. The preamble indicates the start of a message. The remaining fields compose the actual command. The function code identifies the operation being requested, and corresponds to one or more switch actuations. The transmitter ID is a unique binary value associated with each individual transmitter. The sequence number is used to synchronize the transmitter and receiver to account for situations in which messages are received in error due to RF noise, or the transmitter is operated beyond the range of the receiver, or when the transmitter battery is replaced. The receiver will only perform the requested operation when a transmitter ID is recognized as belonging to that receiver, and the authenticator is verified.

Message playback is prevented since the sequence number is incremented with each transmission, therefore recorded messages (i.e., those with smaller than expected sequence numbers) will not be accepted. Spoofing of messages is prevented since modifying the function code (from a lock command into an unlock command, for example) will cause the receiver to calculate an incorrect authenticator. Since the authentication algorithm uses a cryptographic key known only to the transmitter and receiver, unauthorized parties cannot generate the authenticator that corresponds to a function code of their choosing and therefore cannot construct messages that would be acted upon by the receiver. Authenticating the transmitter ID and sequence number is not required since the receiver will ignore messages with unexpected IDs, and an incorrect or modified sequence number will cause the authentication to fail since the authentication algorithm will not be in the correct state.

Figure 4:
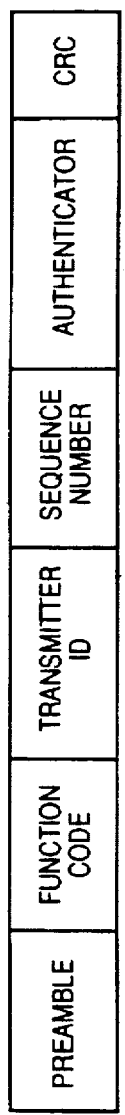
FIG. 4 is an illustration of message structure for receiver programming according to the invention.

The message structure for a resynchronization message is identical to FIG. 3, except that the Sequence Number field contains a randomly generated value instead of the actual sequence number. The message structure for the receiver programming message is shown in FIG. 4.

ALGORITHM EXAMPLE

A number of authentication algorithms are available in the literature and can be used within this invention.

However, a linear feedback shift register (LFSR) with a non-linear output function will be used in the following descriptions due to its simplicity and effectiveness.

Figure 5:
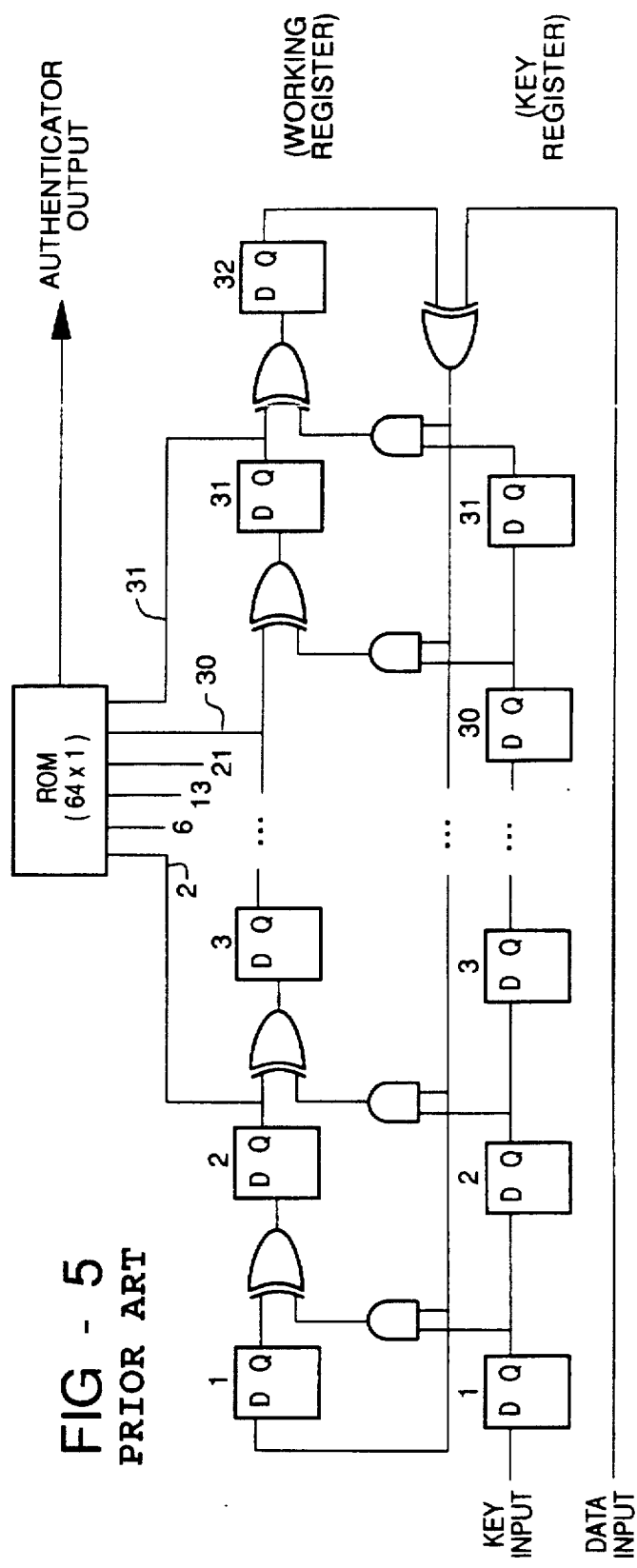
FIG. 5 is a schematic diagram of a prior art cryptographic algorithm design which is useful in carrying out the invention.

A schematic diagram of such an algorithm is shown in FIG. 5. The Working Register is a Galois form of a LFSR, and its feedback polynomial is determined by the contents of the Key Register. Keys should therefore represent primitive irreducible polynomials of a degree appropriate for the length of the Working Register for maximum cryptographic strength, but randomly selected binary sequences can also be used. The ROM implements a table containing non-linear binary sequences that translates an n-bit linear input (n is 6 in this example) to a single non-linear binary output. A series of such outputs are concatenated to create the actual authenticator.

In practice it is preferred to implement the algorithm in software executed by a microprocessor. Due to the unique message structure and the dynamic involvement of the function code field in the algorithm process, a small inexpensive microprocessor is capable of achieving a high level of security in the authenticator and at the same time limiting the authenticator to a short length to minimize transmission time and to thereby economize on battery life.

TRANSMITTER OPERATION

The following description illustrates the typical operations performed when a transmitter button is pressed. It is assumed that a key and an initial seed have been programmed into the transmitter and receiver.

BEGIN normal message transmission

Determine the function code (FC)

Load the Working Register (WR) with the previous seed

Increment the WR x times with input data ="0"

Save the WR state

Increment and save the sequence number (SN)

Mod-2 add the FC to the WR feedback bit-by-bit and increment the WR

Increment the WR y times

Increment the WR z times and read the authenticator output

Assemble the message, calculate the CRC, and transmit the message
END normal message transmission.

When a transmitter button is pressed, its corresponding function code is determined. The previous state of the Working Register is then read from memory and loaded into the Working Register. (For the first operation, it is the initial seed.) The Working Register is then incremented x times, with the input data being x "0"s. The resulting state of the Working Register is then saved back to memory, replacing the previously saved seed, and the sequence number is incremented. The function code is then modulo-2 added to the Working Register feedback on a bit-by-bit basis.

The Working Register is then incremented y times. The Working Register is then incremented an additional z times, with the z bits generated by the algorithm saved for transmission as the authenticator. (The values of x and y are dependent on the particular authentication algorithm used, and z is determined by the desired length of the authenticator. Typical values for the algorithm previously defined are x=8, y=32, and z=24 to provide a high level of security while conserving battery power. Other values could be used, however.)

RECEIVER OPERATION

The following description illustrates the typical operations performed when a message is received:

BEGIN normal message reception

If the message CRC is verified then continue else done

If the transmitter ID is recognized then continue else done

If the received SN is no more than k increments greater than the last SN then continue else done Load the WR with the previous seed corresponding to that transmitter ID Repeat Increment the WR x times with input data ="0"

Increment the sequence number corresponding to that transmitter ID until the sequence number is equal to the received SN Save the WR state in temporary storage Mod-2 add the received FC to the WR feedback bit-by-bit and increment the WR Increment the WR y times Increment the WR z times and read the authenticator output If the calculated authenticator is equal to the received authenticator then continue else done Save the WR state held in temporary storage for that transmitter ID for use as the next seed Save the SN for that transmitter ID Act on the received function code END normal message reception.

Upon receipt of an error-free message with a recognized transmitter ID, the receiver will compare the received sequence number with the sequence number of the last valid message. If the sequence number is equal to or less than the previous one or ahead by more than k increments, the message will be ignored. (Typical values of k may range from 64 to 512.) If the received sequence number is greater by not more than k increments, the receiver will load the Working Register with the seed that corresponds to that particular transmitter ID. (This allows the receiver to automatically resynchronize to the transmitter to recover from those situations in which messages are received in error due to RF noise, or the transmitter is operated beyond the range of the receiver. It also allows one receiver to operate with multiple transmitters.) The receiver will increment the algorithm x times with the input data being "0"s, and increment its sequence number once. This process is repeated until the receiver's sequence number equals the received sequence number. The state of the Working Register is then temporarily saved for later use. The received function code is then modulo-2 added to the Working Register feedback on a bit-by-bit basis. The Working Register is then incremented y more times. The Working Register is incremented an additional z times, and the z bits generated by the algorithm are compared to the received authenticator.

If the authenticators were not equal, the message will be ignored. If they were equal, the state of the Working Register temporarily saved earlier in the process will be saved for later use, replacing the previous seed. The new sequence number would then also be saved, and the receiver would perform the operation indicated by the received function code.

RESYNCHRONIZATION

Since this invention does not use two-way communication, another method was necessary to recover from situations in which the transmitter and receiver lose cryptographic synchronization. This method provides three different forms of resynchronization, depending on the extent of the synchronization loss.

The first level of resynchronization occurs when the transmitter's sequence number is greater than the receiver's by not more than k increments. In this case, the receiver will automatically advance to the transmitter's sequence number and then authenticate the message.

The next level of resynchronization allows recovery when the transmitter's sequence number is greater than the receiver's by more than k increments. This function must be initiated by the user, typically by depressing two buttons simultaneously. (This will usually only be required when the transmitter's battery is replaced.) The following special processing is performed:

BEGIN resync message transmission

Determine the function code (FC)

Generate a random number (R)

Load the Working Register (WR) with the original initial seed

Increment the WR (R*S) times with input data ="0"

Save the WR state for use as the next seed

Reset and save the sequence number (SN)

Mod-2 add the FC to the WR feedback bit-by-bit and increment the WR

Increment the WR y times

Increment the WR z times and read the authenticator output

Assemble the message with R in the Sequence Number field, calculate the CRC, and transmit the message
END resync message transmission.

Typical values of R and S may range from 32 to 256. The receiver will perform the following processing when this resynchronization message is received:

BEGIN resync message reception

If the message CRC is verified then continue else done

If the transmitter ID is recognized then continue else done

Load the WR with the original initial seed corresponding to that transmitter ID

Increment the WR (R*S) times with input data ="0"

Save the WR state in temporary storage

Mod-2 add the received FC to the WR feedback bit-by-bit and increment the WR

Increment the WR y times

Increment the WR z times and read the authenticator output

If the calculated authenticator is equal to the received authenticator then continue else done Save the WR state held in temporary storage for that transmitter ID for use as the next seed Reset and save the SN for that transmitter ID END resync message reception.

The final level of resynchronization (or initialization) is used to program the receiver to recognize the particular transmitter. This should only be required when transmitters or the receiver are replaced due to loss or failure. (It can also used by the keyless entry system manufacturer to initially pair transmitters to a receiver.) Transmission of this message, shown in FIG. 4, must also be manually initiated, for example by depressing two buttons and holding them down for some length of time. In order for this message to be acted upon by the receiver, the receiver must be set in a program mode by a program switch 22 (FIG. 1). For example, a jumper is inserted into a special connector located somewhere within the vehicle. The following special processing is performed:

BEGIN receiver programming message transmission

Determine the function code (FC)

Assemble the message, calculate the CRC, and transmit the message

Delay and transmit the message again

END receiver programming message transmission.

Figure 6:
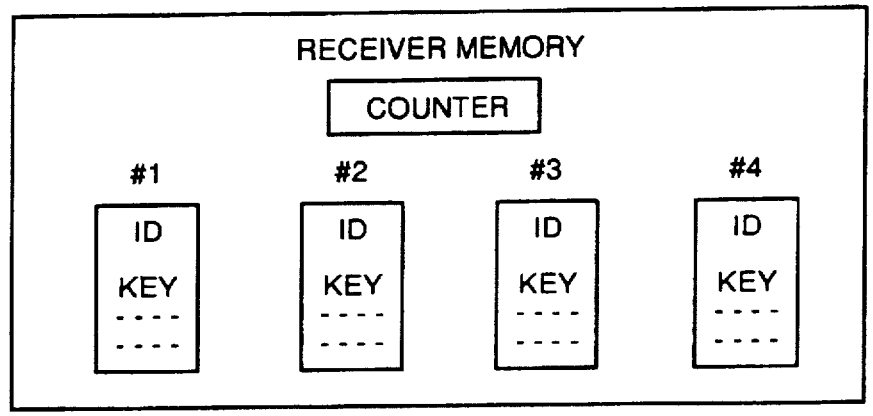
FIG. 6 is an expanded view of the receiver memory portion of FIG. 5.

When the message is received the data is written to the receiver memory. An expanded view of the memory is shown in FIG. 6. It includes four memory locations numbered 1 through 4, each location having room for the ID, the key, the seed, the sequence number and the initial seed as in FIG. 2. The memory also has a a counter which is controlled by software.

The receiver will perform the following processing when a receiver programming message is received:

BEGIN receiver programming message reception

If the message CRC is verified then continue, else done

If the program switch is activated, then continue else done

Set the counter to zero

Save the received transmitter ID, initial seed, and cryptographic key of the first transmitter in location number 1

Increment the counter to number 1

Repeat for other transmitters so that the data is stored in ordered sequence and the counter is incremented to the memory location number.

When the program switch is reset save the final counter value.

END receiver programming message reception.

Figure 7:
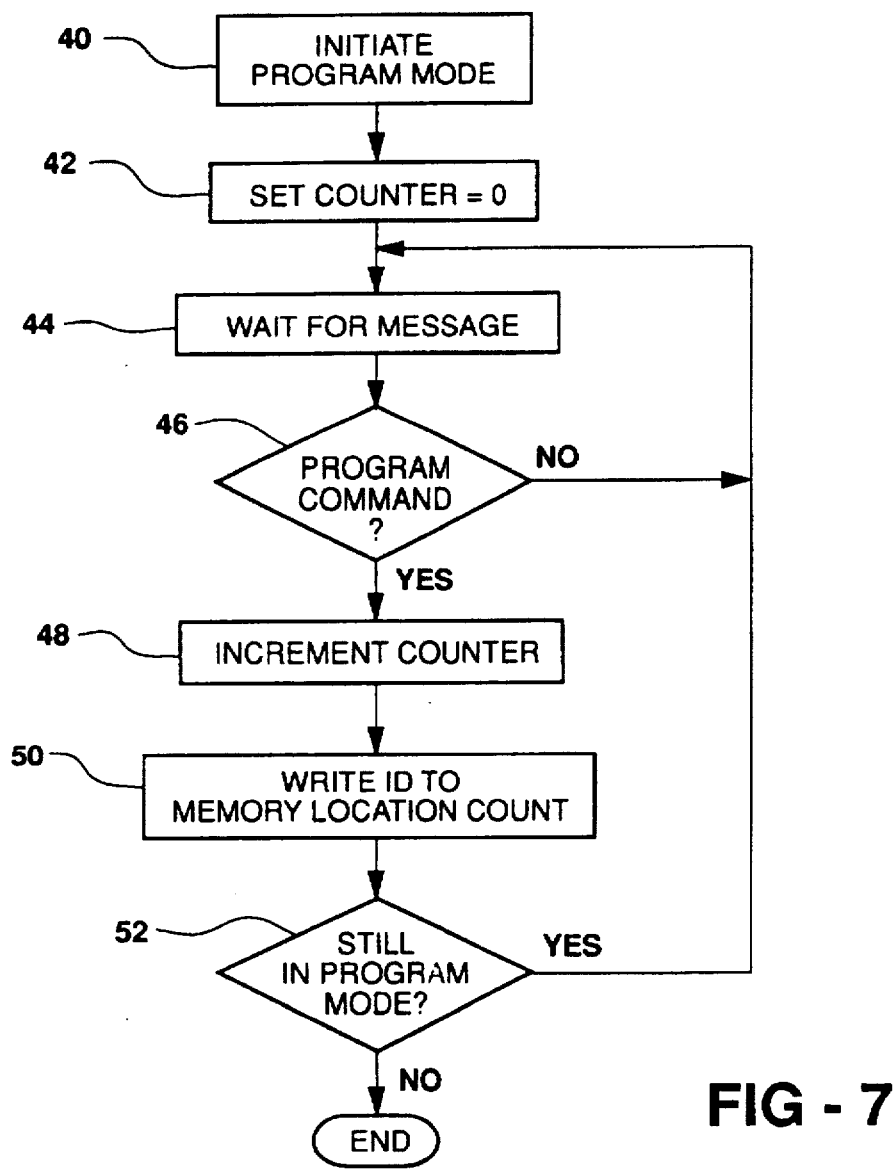
FIG. 7 is a flow chart of a method for programming the receiver to accept new transmitters according to the invention.

This programming method is illustrated by the flow chart of FIG. 7. Here and in FIG. 9 the functional description of each block in the chart is accompanied by a number in angle brackets <nn> which corresponds to the reference number of the block. When the program mode is initiated <40> the counter is set to zero <42> and the microprocessor waits for a message from a transmitter <44>. If a message does not contain a program command <46>the routine returns to the wait step. When a program command is received <46> the counter is incremented to 1 <48> and the ID is written to the memory in the number 1 location <50>. Then if the receiver is still in program mode <52> the routine again returns to the wait step. Each subsequent program command message will cause the counter to increment again <48> and the ID will be written at the corresponding location <50>. The program ends when the program mode is terminated.

Figures 8, 9:
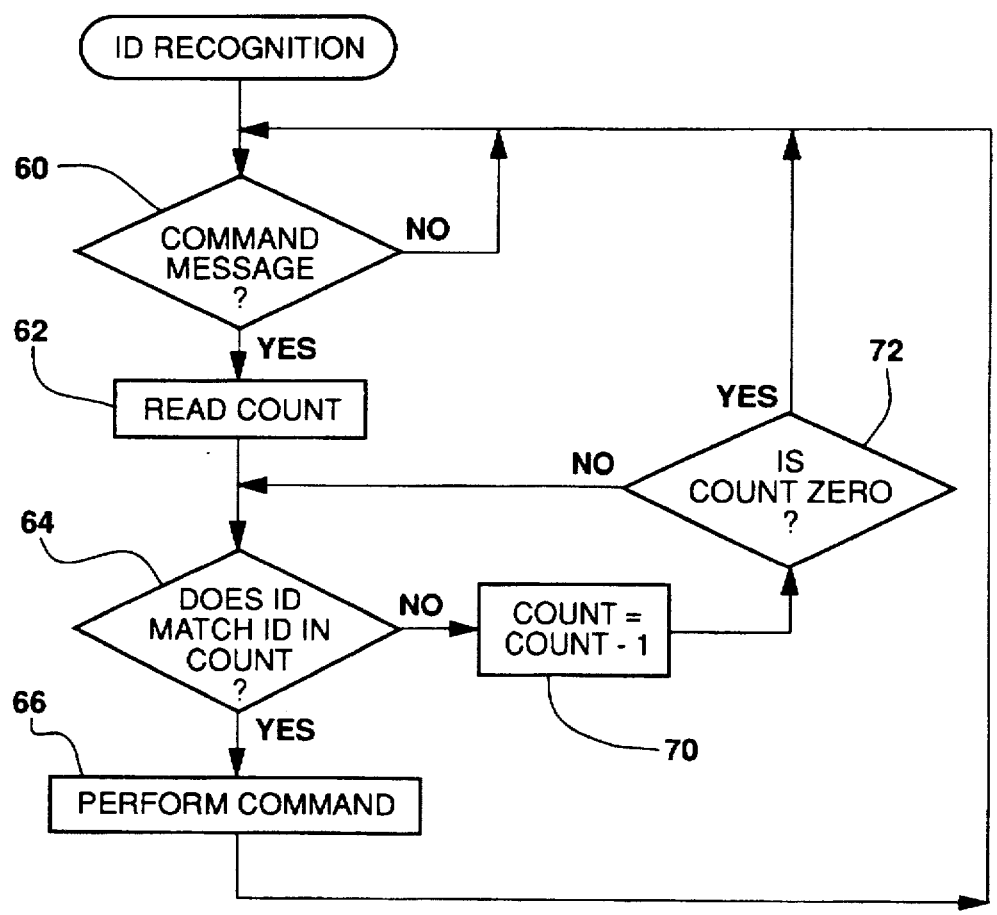
FIG. 8 is a table illustrating the storage of new and old IDs in receiver memory.
FIG. 9 is a flow chart of a method of accessing valid ID numbers when receiving transmitted messages according to the invention.

The table shown in FIG. 8 illustrates the effect of programming on the content of the memory locations for the case where all locations 1–4 were already filled with IDs and corresponding data as shown in the "Before" column, and during programming two other transmitters sent command messages to the receiver. The first transmitter then overwrote the ID "TY" in the location 1 with the new ID "AP", and the second transmitter overwrote the ID "ZA" with a new ID "YM". The IDs "CD" and "GX" in the third and fourth positions are unchanged. During this process the counter would have arrived at a count of 2.

The normal message reception operation discussed under the heading "RECEIVER OPERATION" above requires a step of recognizing the ID. This is implemented as shown in the flow chart of FIG. 9. When a command message is received <60> the count is read <62> and if the message ID matches the ID in the memory location corresponding to the count, the command in the message is performed <66>. Thus, if the final count were 2 as in the above example, step 64 would compare the message ID to that stored in memory location 2. If there were no match <64> the count is decremented <66> and if the count has not reached zero <72> the matching step 64 would be repeated. When the count does reach zero <72> the routine will return to step 60 to wait for another message. Thus the ID recognition program effectively removes from consideration the IDs stored in positions higher than the count value.

SECURITY ANALYSIS

The ability of this invention to provide a high level of message protection depends on a number of factors. For example, the length of the authenticator and key space of the algorithm must be selected to minimize the likelihood that an exhaustive search can succeed. The algorithm must also be designed to avoid any mathematical weaknesses that would allow valid authenticators to be created, or its keys to be recovered, using analytical techniques alone. The system itself must also be considered, since improper implementation of the security mechanisms may introduce additional vulnerabilities that can be exploited by an adversary. In the limit, no attack scenario should be successful in less time or with fewer resources than required for an exhaustive search. The invention meets these requirements.

Playback and Spoof Attacks

This invention uses cryptographic authentication to protect keyless entry systems from accepting recorded messages that have been played back as well as those that have been modified and played back. It also protects against transmitters intended to deceive the receiver into accepting unauthorized messages as legitimate.

Recorded messages will not be accepted as valid due to the sequence number and authenticator. For example, the receiver's sequence number is incremented with each valid reception, and it will not accept messages with an equal or smaller sequence number. In addition, the sequence number itself cannot simply be modified since that would alter the authenticator calculated when the false message is received.

The message also cannot be modified in such a way as to be acceptable to the receiver since the authenticator is based on mathematically complex interactions among the algorithm, the key, a unique initial seed, and the function code. Even if the algorithm and key are known to a thief, he will not know the initial seed for any particular transmitter since they are unique to each transmitter and are generated randomly when the transmitters are programmed during their manufacture. Without knowledge of the initial seed, possession of the algorithm, key, and sequence number will not allow a valid authenticator to be economically generated for any given function code.

The same reasoning applies to messages from unauthorized transmitters intending to deceive a receiver into accepting function codes of the thief's choice. A valid authenticator cannot be calculated for any given transmitter without knowledge of its unique initial seed, even if the thief knows the algorithm, key, and sequence number.

A recorded message also cannot be played back to a different receiver since their initial seeds are different. This would cause the authenticators to fail, even if the transmitter ID and sequence numbers were modified to be valid for that receiver and the proper key was used.

The embodiments of the invention in which an exclusive property or privilege is claimed are defined as follows:

1. In a keyless entry system for performing any of several commanded functions in a protected environment and having a receiver and a plurality of remote transmitters, each transmitter having an ID and the receiver having a memory for storing a plurality of IDs, a method of operation for the receiver for recognizing and responding to at least one substitute transmitter ID in lieu of previously entered IDs comprising the steps of:

entering a program mode by manually enabling the receiver for initialization;

receiving a message from each substitute transmitter including its ID;

storing each received ID in the receiver memory thereby writing over any IDs previously stored in corresponding memory locations;

identifying the memory locations containing substitute transmitter IDs;

then when in an access mode, comparing the IDs of received messages to only those IDs in the identified memory locations to determine the existence of a match, whereby previously stored IDs in other memory locations are ignored; and performing a commanded function contained in a received message only when a match results.

2. The method of operation as defined in claim 1 wherein:

the step of storing each received ID comprises writing each ID as received in a sequential memory location; and the step of identifying the memory locations comprises incrementing a counter for each received ID so that each memory location corresponds to a counter value, and saving data identifying the counter values.

3. The method of operation as defined in claim 1 including:

setting a counter to zero upon initialization;

the step of storing each received ID comprises writing each ID as received in a sequential memory location;

the step of identifying the memory locations comprises incrementing a counter for each received ID so that each memory location corresponds to a counter value, and saving a final counter value; and in an access mode, determining the identified memory locations by reference to the final counter value and to lesser counter values.

* * * * *